(12) United States Patent
Shih

(10) Patent No.: US 9,039,025 B1
(45) Date of Patent: May 26, 2015

(54) FOLDABLE CHILDREN'S TRICYCLE

(71) Applicant: Ming-He Shih, Tainan (TW)

(72) Inventor: Ming-He Shih, Tainan (TW)

( * ) Notice: Subject to any disclaimer, the term of this patent is extended or adjusted under 35 U.S.C. 154(b) by 0 days.

(21) Appl. No.: 14/283,391

(22) Filed: May 21, 2014

(51) Int. Cl.
*B62K 15/00* (2006.01)
*B62K 9/02* (2006.01)

(52) U.S. Cl.
CPC ................. *B62K 15/006* (2013.01); *B62K 9/02* (2013.01)

(58) Field of Classification Search
CPC ..... B62K 15/00; B62K 15/006; B62K 15/008
USPC .......................... 280/282, 278, 287
See application file for complete search history.

(56) References Cited

U.S. PATENT DOCUMENTS

| | | | | |
|---|---|---|---|---|
| 6,152,473 A * | 11/2000 | Shih | ............................... | 280/278 |
| 6,530,589 B1 * | 3/2003 | Ma | ................. | 280/278 |
| 6,575,486 B2 * | 6/2003 | Ma | ................. | 280/287 |
| 6,609,723 B2 * | 8/2003 | Chuang | ......................... | 280/287 |
| 6,935,649 B2 * | 8/2005 | Lim | ............................... | 280/278 |
| 6,966,572 B2 * | 11/2005 | Michelau et al. | ............. | 280/287 |

* cited by examiner

*Primary Examiner* — Joseph Rocca
*Assistant Examiner* — Michael Stabley
(74) *Attorney, Agent, or Firm* — Rosenberg, Klein & Lee

(57) ABSTRACT

A foldable children's tricycle comprises a tricycle front, a link device and a positioning assembly. The tricycle can be folded by using the link device, which can save space and reduce transportation cost. In addition, an inserting rod of the positioning assembly can be engaged in first or second positioning grooves of the link device, so the tricycle can be fixed when expanding or folding, thus improving the structural strength of the tricycle.

3 Claims, 7 Drawing Sheets

FOLDABLE CHILDREN'S TRICYCLE

BACKGROUND OF THE INVENTION

1. Field of the Invention

The present invention relates to a foldable children's tricycle, and more particularly to a foldable children's tricycle that can be fixed when expanding or folding.

2. Description of the Prior Art

A conventional children's tricycle generally comprises a tricycle front, a pair of handlebars, a pair of pedals and a front wheel. When a child sits on the tricycle and steps on the pedals, with both hands holding the handlebars, the front wheel will move forward. In addition, at a appropriate position of the tricycle front is backwardly connected a bone lever, at a central position of the bone lever is fixed a seat, at a rear end of the bone lever is fixed a connecting rod by welding, and a pair of rear wheels are pivoted to both sides of the connecting rod, so that the child can sit on the seat and step on the pedals, so as to make the front wheel and the rear wheels move forward, thus reaching child riding tricycle purpose. However, such a tricycle is large and can not be folded, causing inconvenient to carry and take up space, which will increase the transportation cost.

U.S. Pat. No. 6,152,473 discloses a folding collapsible baby tricycle, which comprises a bone lever pivotally assembled with a support rod at a front end thereof and pivotally provided with a connecting rod at a rear end thereof, the support rod and the connecting rod are pivoted to a link rod, respectively, such a tricycle is foldable, so it is convenient to carry and can reduce the transportation cost. However, such a tricycle can not be fixed when expanding or folding, so the structure is not stable, causing the danger of riding, and the tricycle can easily be expanded by external malfunction after being folded, so it is inconvenient to carry.

The present invention has arisen to mitigate and/or obviate the afore-described disadvantages.

SUMMARY OF THE INVENTION

The primary objective of the present invention is to provide a foldable children's tricycle comprises: a tricycle front, a link device and a positioning assembly.

The tricycle front is provided with a support rod.

The link device is provided with a bone lever pivoted to the support rod, a connecting seat pivoted to the bone lever, a link rod with both ends pivoted to the support rod and the connecting seat, respectively, and an elastic member with one end hooking on the bone lever. The bone lever is defined with two opposite through holes. The connecting seat is defined with two opposite first positioning grooves and two opposite second positioning grooves.

The positioning assembly is provided with a driving rod, a front end of the driving rod is bent and extended to form an inserting rod for inserting in the through holes, the other end of the elastic member hooks on the inserting rod, and the inserting rod is engaged in the first or second positioning grooves, so as to expand or fold the children's tricycle.

The bone lever includes two opposite assembling portions and a protruding block located at an outer side surface of one of the assembling portions, and the one end of the elastic member hooks on the protruding block.

The bone lever is further provided with two opposite stop blocks located at inner side surfaces of the assembling portions and abutted against an upper end surface of the connecting seat.

A rear end of the driving rod of the positioning assembly is connected to a grip.

The children's tricycle of the present invention further includes a housing for covering the bone lever and the positioning assembly, and the housing is defined with a receiving hole for receiving the grip.

The inserting rod can be engaged in the first positioning grooves or the second positioning grooves, so the tricycle can be fixed when expanding or folding, which can improve the structural strength of the tricycle after being folded or expanded, ensuring the security of the rider, and the tricycle will not be expanded by external malfunction after being folded, so it is convenient to carry.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
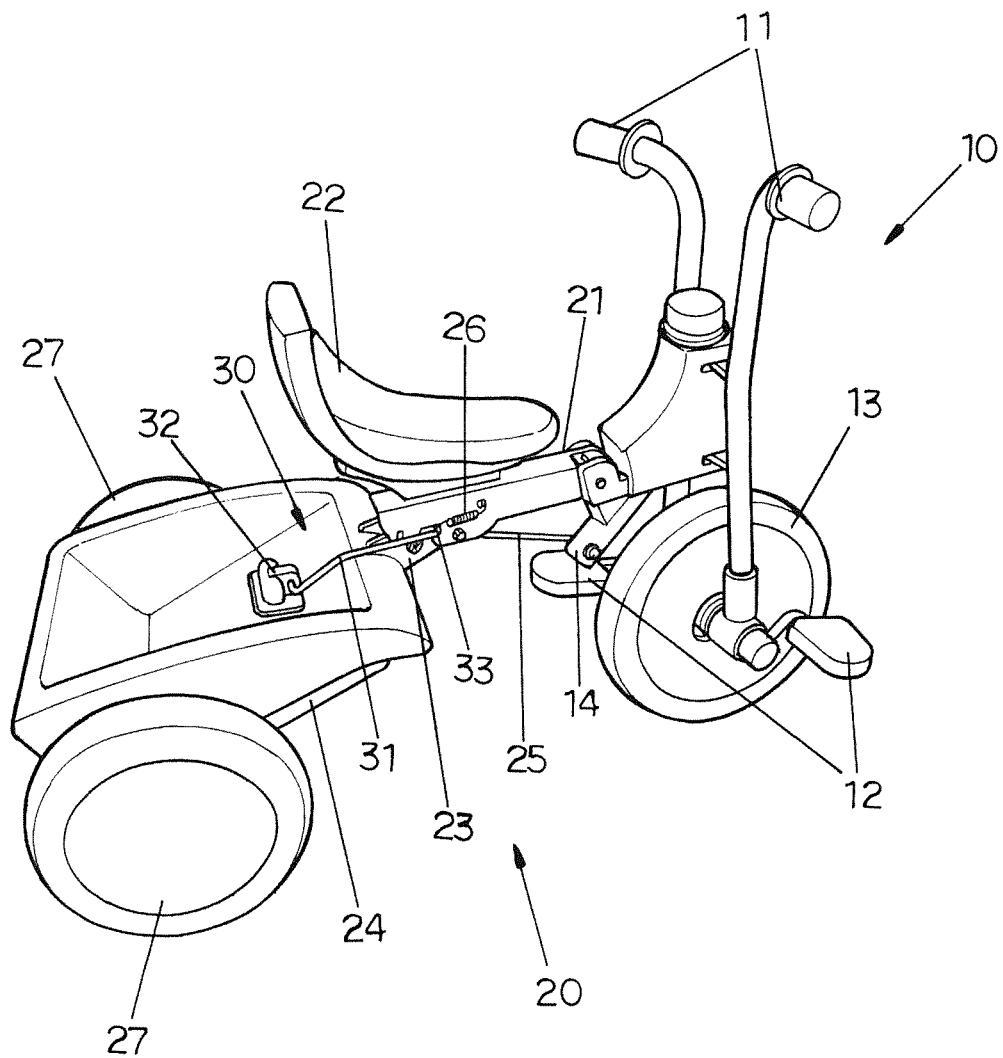
FIG. 1 is a perspective view of showing a foldable children's tricycle after being expanded.
Figure 2:
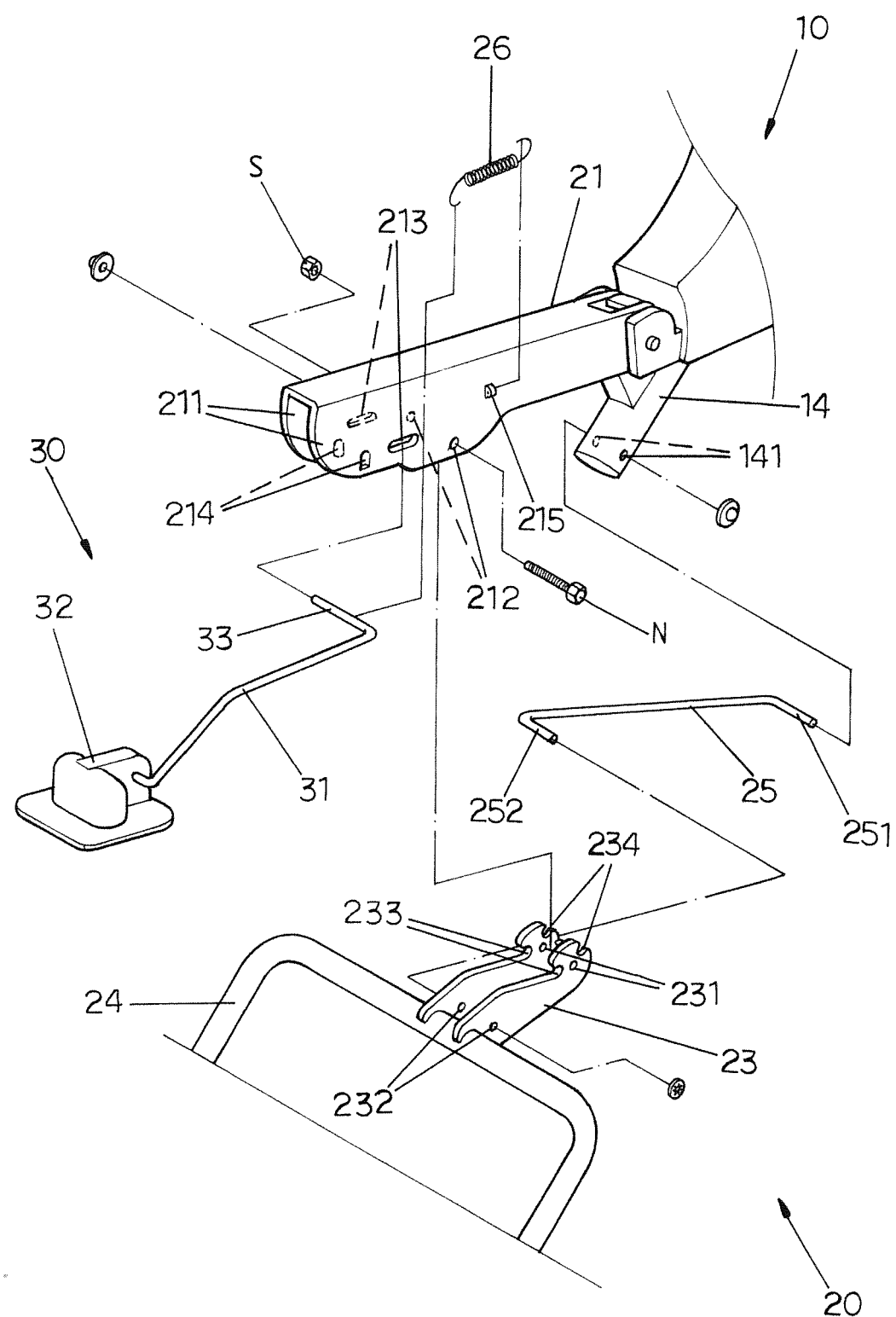
FIG. 2 is a partial exploded view of showing the related positions of a support rod, a bone lever, a connecting seat, a connecting rod and a positioning assembly.

Referring to FIGS. 1-2, a foldable children's tricycle in accordance with the present invention comprises a tricycle front 10, a link device 20 and a positioning assembly 30.

The tricycle front 10 is provided with a pair of handlebars 11, a pair of pedals 12, a front wheel 13 and a support rod 14 having two opposite pivot holes 141. When a child sits on the tricycle and steps on the pedals 12, with both hands holding the handlebars 11, the front wheel 13 will move forward.

The link device 20 is provided with a bone lever 21 pivoted to the support rod 14, a seat 22 disposed on the bone lever 21, a connecting seat 23 pivoted to the bone lever 21, a connecting rod 24 fixed to the connecting seat 23, a link rod 25 with both ends pivoted to the support rod 14 and the connecting seat 23, respectively, and an elastic member 26. The bone lever 21 includes two opposite assembling portions 211, two opposite assembling holes 212 penetrating the assembling portions 211, two opposite through holes 213 penetrating the assembling portions 211, two opposite stop blocks 214 located at inner side surfaces of the assembling portions 211, and a protruding block 215 located at an outer side surface of one of the assembling portions 211. The connecting seat 23 is defined with two opposite penetrating holes 231, two opposite through holes 232, two opposite first positioning grooves 233 and two opposite second positioning grooves 234. Both ends of the link rod 25 are bent to form locking portions 251, 252. One end of the elastic member 26 hooks on the protruding block 215.

The positioning assembly 30 is provided with a driving rod 31 and a grip 32 connecting to a rear end of the driving rod 31, and a front end of the driving rod 31 is bent and extended to form an inserting rod 33.

Figure 3:
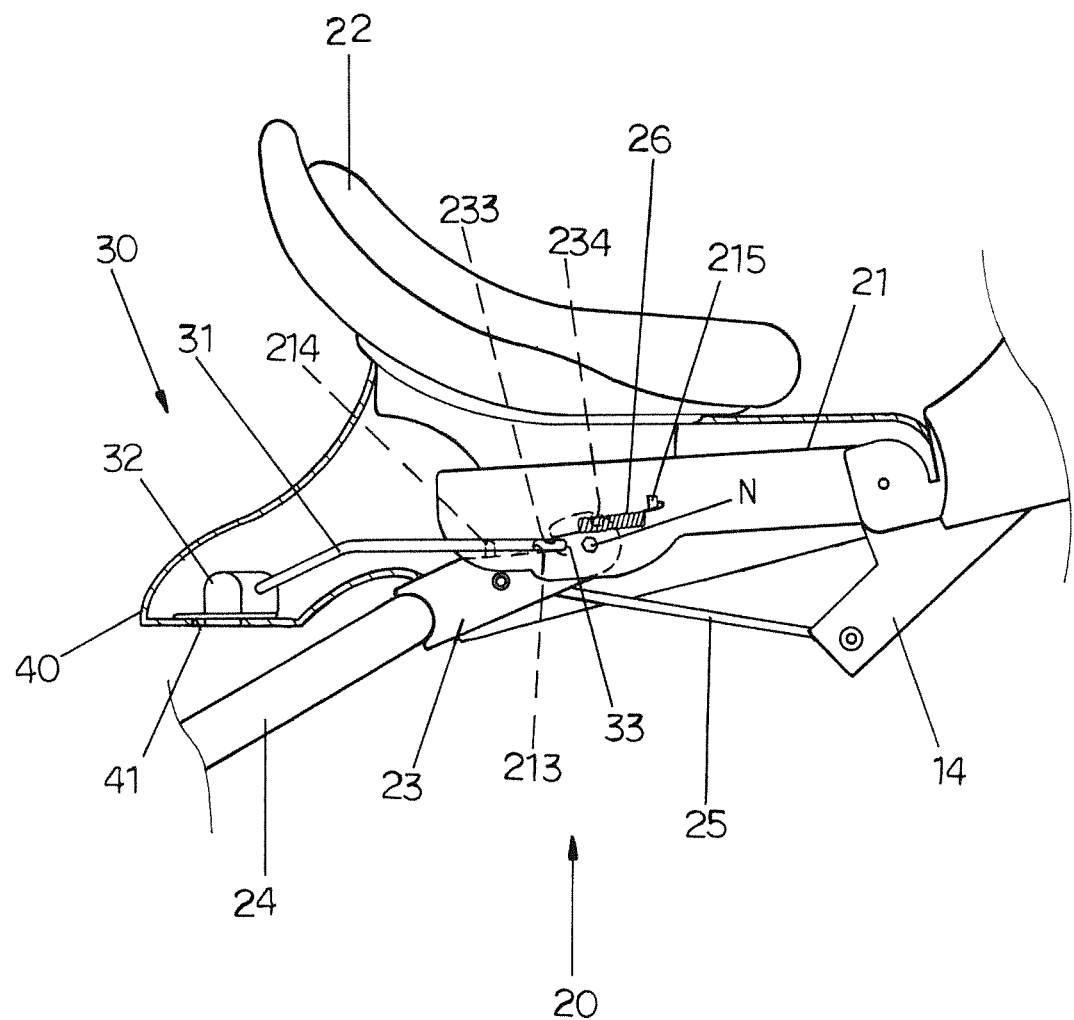
FIG. 3 is a partial assembly cross sectional view of showing an elastic member that hooks on a protruding block and an inserting rod after the tricycle is expanded.
Figure 4:
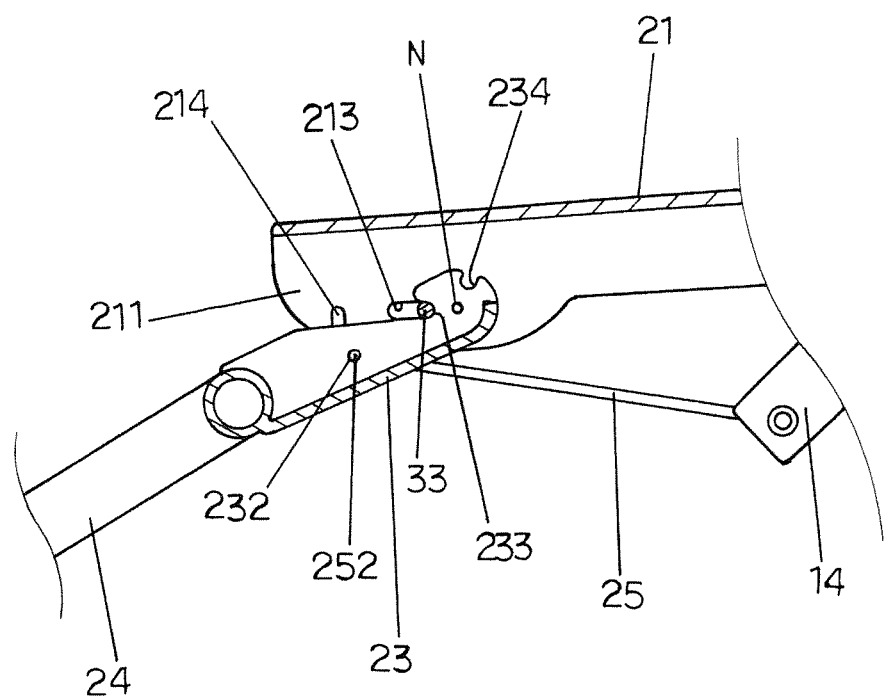
FIG. 4 is another partial assembly cross sectional view of showing the inserting rod being engaged in two first positioning grooves after the tricycle is expanded.

Referring to FIGS. 3-4, when assembling, a bolt N is threaded with a nut S by passing through the assembling holes 212 and the penetrating holes 231, so as to make the bone lever 21 pivoted to the connecting seat 23. The locking portions 251, 252 of the link rod 25 are inserted in the pivot holes 141 of the support rod 14 and the through holes 232 of the connecting seat 23, the inserting rod 33 is inserted in the through holes 213 and engaged in the first positioning grooves 233, the other end of the elastic member 26 hooks on the inserting rod 33, and the stop blocks 214 is abutted against an upper end surface of the connecting seat 23, so as to expand the tricycle for riding. In addition, a pair of rear wheels 27 is mounted on both sides of the connecting rod 24, so that the child can sit on the seat 22, with his/her feet stepping on the pedals 12, so as to make the front wheel 13 and the rear wheels 27 freely walking forward, reaching child riding tricycle purpose.

Figure 5:
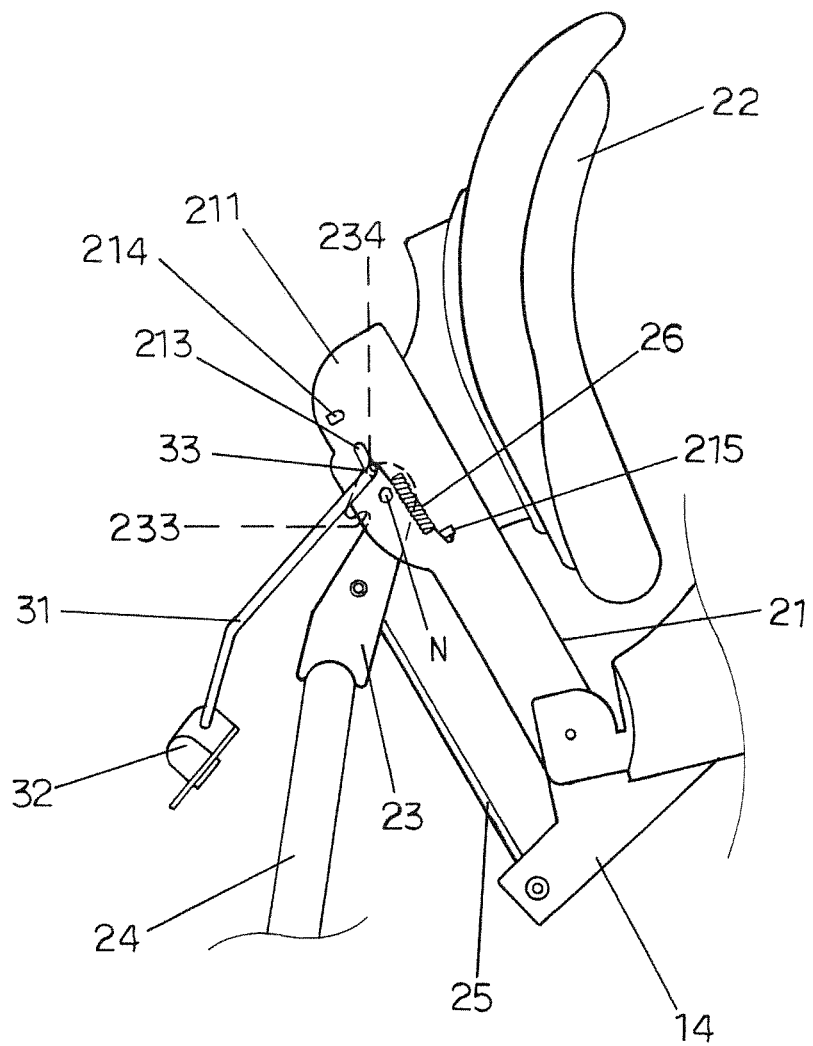
FIG. 5 is a partial assembly plan view of showing the connecting seat that moves forwardly and near the bone lever after the tricycle is folded.
Figure 6:
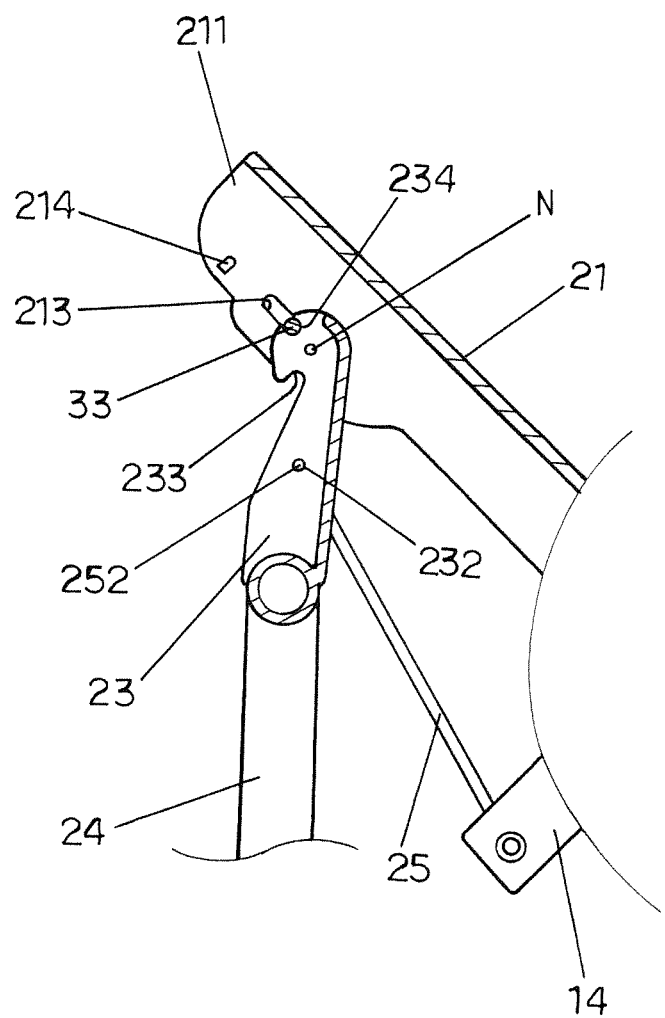
FIG. 6 is another partial assembly cross sectional view of showing the inserting rod being engaged in two second positioning grooves after the tricycle is folded.
Figure 7:
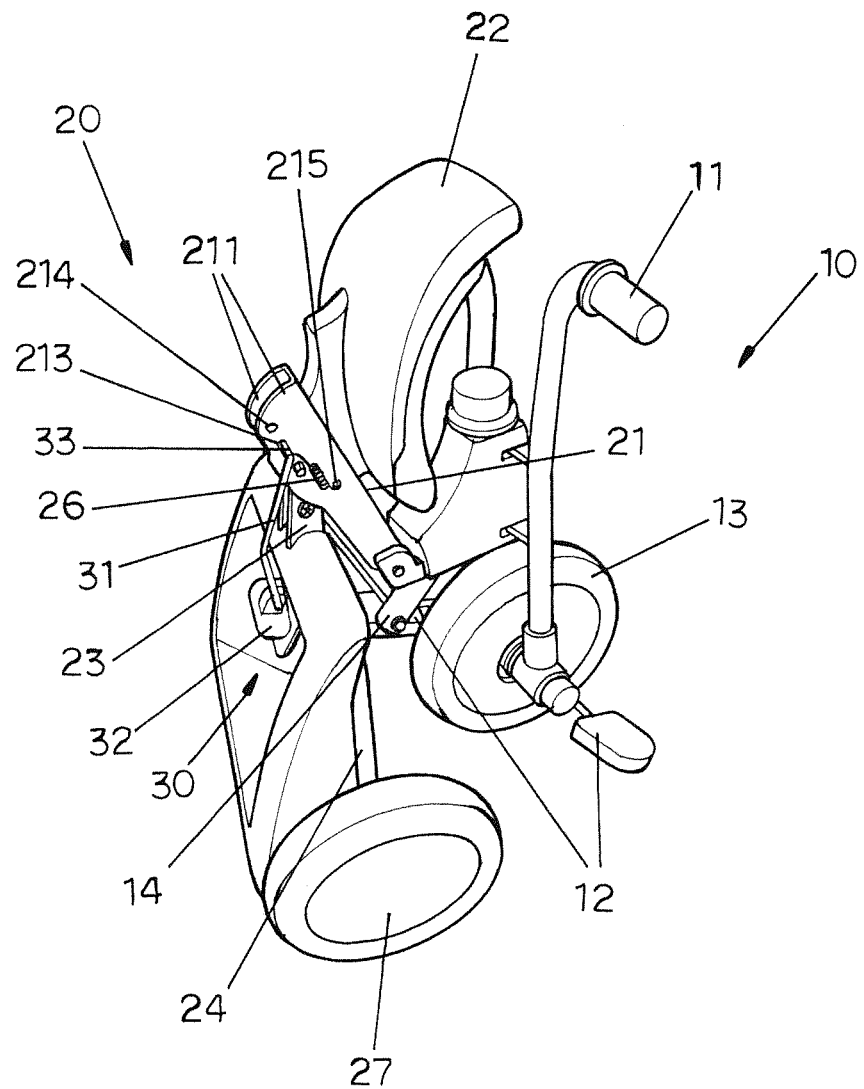
FIG. 7 is a perspective view of showing the foldable children's tricycle after being folded.

Referring to FIGS. 5-7, when not in use, the user firstly pulls the grip 32 backwardly to move the driving rod 31 backwardly, such that the inserting rod 33 will move in the through holes 213 backwardly and will be disengaged with the first positioning grooves 233. And then the user pulls the seat 22 upwardly to move the connecting seat 23 forwardly by taking the bolt N as a fulcrum to make it vertical shaped and move the bone lever 21 forwardly to make it slightly vertical shaped, such that the stop blocks 214 will separate from the upper end surface of the connecting seat 23 and the inserting rod 33 will move along the upper end surface of the connecting seat 23 to release the grip 32, so as to make the elastic member 26 restored and the inserting rod 33 engaged in the second positioning grooves 234, such that the connecting seat 23 is fixed to the bone lever 21 stably, thus folding the tricycle. When in use, the user can operate the above-mentioned folding actions reversely, pull the driving rod 31 backwardly and move the seat 22 downwardly, so as to expand the tricycle for riding as shown in FIG. 1.

Referring to FIG. 3, the children's tricycle of the present invention further includes a housing 40 for covering the bone lever 21 and the positioning assembly 30, and the housing 40 is defined with a receiving hole 41 for receiving the grip 32.

It is apparent from the above-mentioned descriptions that the present invention has the advantages described as follows:

The children's tricycle can be folded by using the link device 20, which can save space and reduce transportation cost. In addition, the inserting rod 33 can be engaged in the first positioning grooves 233 or the second positioning grooves 234, so the tricycle can be fixed when expanding or folding, which can improve the structural strength of the tricycle, ensuring the security of the rider, and the tricycle will not be expanded by external malfunction after being folded, so it is convenient to carry.

While we have shown and described various embodiments in accordance with the present invention, it should be clear to those skilled in the art that further embodiments may be made without departing from the scope of the present invention.

What is claimed is:

1. A foldable children's tricycle comprising:
    a tricycle front being provided with a support rod;
    a link device including a bone lever being pivoted to the support rod and including two opposite assembling portions and a protruding block located at an outer side surface of one of the assembling portions, a connecting seat being pivoted to the bone lever, a link rod with both ends pivoted to the support rod and the connecting seat, respectively, an elastic member with one end hooking on the protruding block of the bone lever, the bone lever being defined with two opposite through holes and further being provided with two opposite stop blocks located at inner side surfaces of the assembling portions and abutted against an upper end surface of the connecting seat, the connecting seat being defined with two opposite first positioning grooves and two opposite second positioning grooves; and
    a positioning assembly including a driving rod, a front end of the driving rod being bent and extended to form an inserting rod for inserting in the through holes, the other end of the elastic member hooking on the inserting rod, the inserting rod being engaged in the first or second positioning grooves.

2. The foldable children's tricycle as claimed in claim 1, wherein a rear end of the driving rod of the positioning assembly is connected to a grip.

3. The foldable children's tricycle as claimed in claim 2 further includes a housing for covering the bone lever and the positioning assembly, and the housing is defined with a receiving hole for receiving the grip.

\* \* \* \* \*